Sept. 2, 1930.  W. F. KOLETA  1,775,080
TIRE BUILDING APPARATUS
Filed May 17, 1929    8 Sheets-Sheet 5

Sept. 2, 1930.  W. F. KOLETA  1,775,080
TIRE BUILDING APPARATUS
Filed May 17, 1929  8 Sheets-Sheet 7

Sept. 2, 1930.  W. F. KOLETA  1,775,080
TIRE BUILDING APPARATUS
Filed May 17, 1929   8 Sheets-Sheet 8

William F. Koleta
INVENTOR

BY Victor J. Evans
ATTORNEY

WITNESS:

Patented Sept. 2, 1930

1,775,080

UNITED STATES PATENT OFFICE

WILLIAM F. KOLETA, OF AKRON, OHIO

TIRE-BUILDING APPARATUS

Application filed May 17, 1929. Serial No. 363,926.

The object of this invention is to provide means for building tire structures in flat form by employing folded tire bands of the kind disclosed in my U. S. applications Serial Nos. 133,694 filed Sept. 4, 1926, and 237,317 filed Dec. 2, 1927, or other forms of bands.

A further object is to materially reduce the cost of manufacture by effecting a more speedy operation than those commonly in use, and to provide uniformity in the product by eliminating hand work so far as practicable.

A further object is to provide in connection with a moving conveyor carrying the elements being assembled, a plurality of units respectively producing the different steps of the operation, and to provide for throwing out the actuating means disclosed, in the event of delayed action by any of the workmen responsible for the individual steps.

With the foregoing and other objects in view, the invention consists in the novel construction and arrangement of elements employed in the apparatus, it being understood that modifications may be made within the scope of the claims.

In the drawings forming part of this application.

It may here be stated that this apparatus, automatically timed, is adapted for building tires on a surface presenting a plane, whether the elements are folded as described or are flat, and if folded, the fold may be employed to reinforce the bead, or for a similar purpose, instead of trimming it off by cutting.

Direct control of the apparatus may be secured by push button switches or the like, and a foot controlled safety switch or switches may be positioned where the operators can press thereon when inserting a tire unit, for the purpose of rendering the applying device or devices temporarily inactive.

Figure 1:
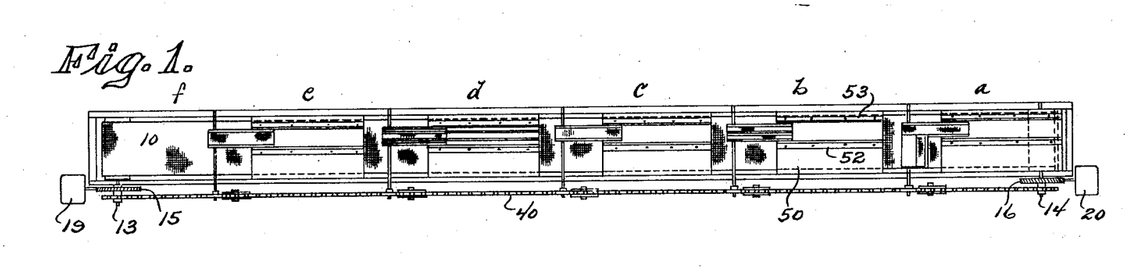
Figure 1 is a view showing the relative position of the units of the apparatus, in top plan.
Figure 2:
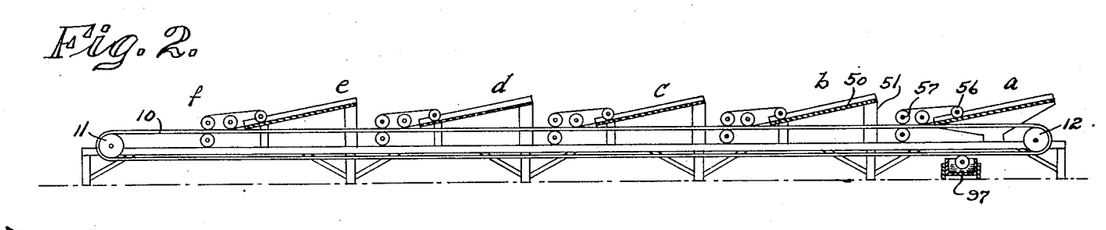
Figure 2 is a view in vertical longitudinal section with parts in elevation.
Figure 3:
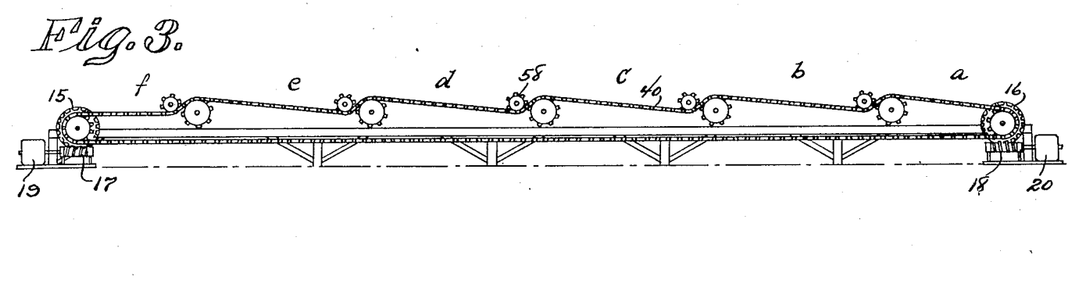
Figure 3 shows the series of rolls in end elevation, the view being taken longitudinally of the machine and illustrating especially the drive imparted to the rolls by motors positioned at opposite ends of the apparatus and designed to be synchronized.

The apparatus includes a plurality of units such as those shown in Figures 1 and 2, and there designated reading from right to left $a, b, c, d, e, f$. The conveyor belt is designated 10, and passes over end rollers 11 and 12, these rollers being carried by shafts 13 and 14 respectively, and the shafts carrying worm wheels 15 and 16 driven respectively by worms 17 and 18. The latter receive their motion from the armature shafts of motors 19 and 20, these motors being designed to be driven in synchronism, and the circuit therefor being under the control of the switching device shown at the lower part of Figure 5, so that an operator can by pressing the treadle such as treadle 21, throw out the switch blade 22 and break the circuit thru conductor 23 included in the motor circuit.

Figure 5:
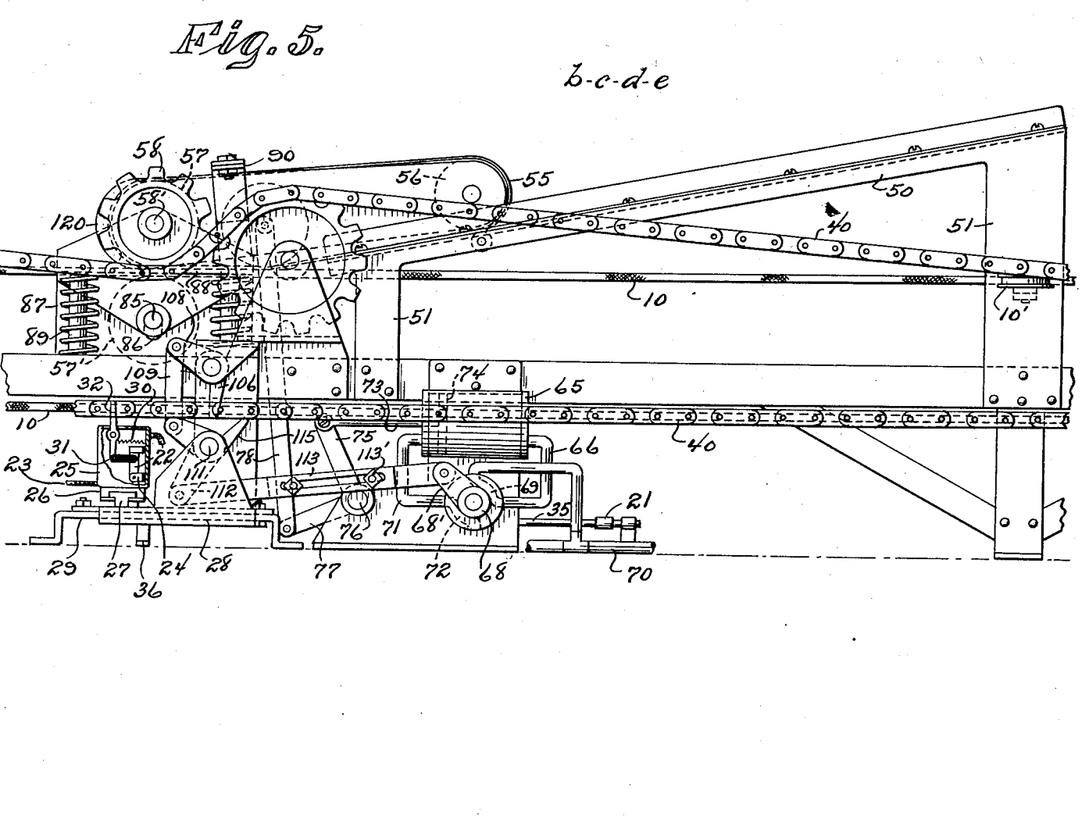
Figure 5 is an elevation of any intermediate unit between the end units of Figure 1.
Figure 6:
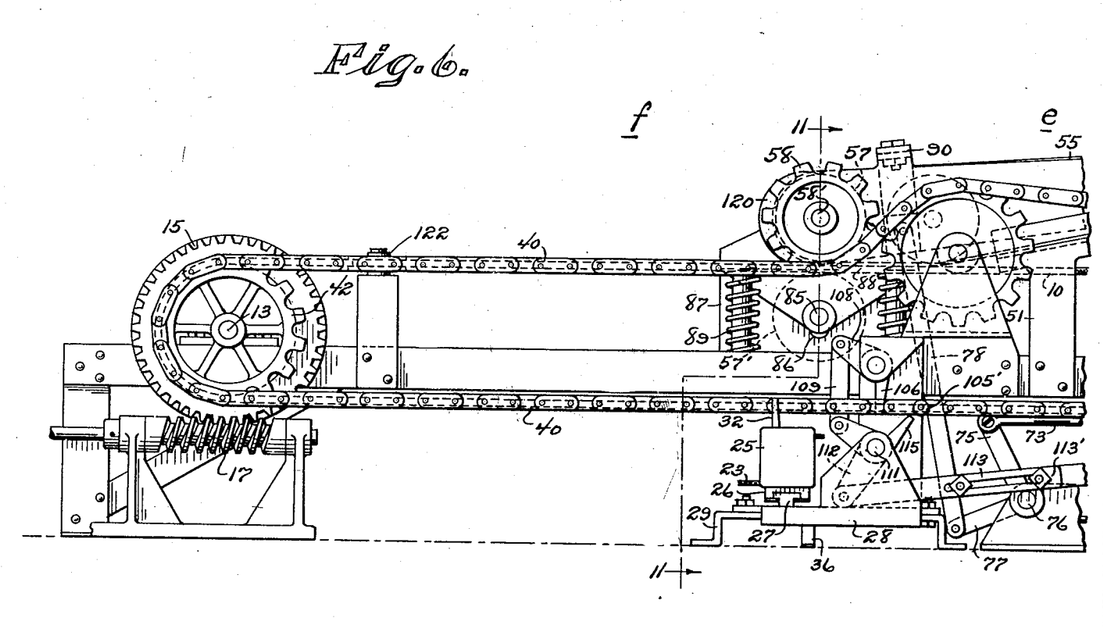
Figure 6 is an elevation of unit "f" or the left hand unit of Figures 1, 2 and 3, with part of unit e.

The switch blade 22 is pivotally mounted at 24 in housing 25, and the latter is provided on its lower side, with guiding devices 26 slidable laterally of the direction of movement of the conveyor, upon an element 27. This device last named is carried upon a tubular or channeled element 28 adjustable on bar 29. The blade is controlled in part by spring 30, and the other conductor leading from the switching device is shown at 23⁷. The switch blade is also controlled by link 31 and trip 32 operated as indicated below.

A rock shaft 35 is mounted in bearings such as 36, and treadle 21 carried by this shaft is adapted to impart motion to the latter, and by means of arm 37 will impart lateral movement to rod 38 connected with the slidable housing 25 of the switching apparatus. This permits of the throwing into operative position of the trip 32, by movement laterally with reference to engaging means on chain 40 by means of which the movable elements of the several units $a$ to $f$ inclusive are operated. Chain 40 passes over sprocket wheels 41 and 42 on the shafts carrying the end rollers 11 and 12.

Adjustment of the conveyor belt 10, with reference to the longitudinal tension thereof, is effected by means of threaded rods such as 43 controlled by wheels 44 adapted for hand adjustment, the hubs of the wheels bearing on the brackets or plates 45. Rods 43 are connected with the bearings 46 of the end rollers.

The individual units each include inclined elements 50 supported as at 51, and longitudinal guides are mounted as shown in Figure 1 and elsewhere, one of these guides 52 being laterally adjustable, and the other being stationary if desired. The guide last mentioned is shown at 53, and the distance between the elements 52 and 53 depends upon the width of the tire band employed at a given time for building a particular tire.

In connection with unit $a$, a band or belt 55 is illustrated, and similar belts are shown elsewhere in connection with the other units, or some of them. These belts 55 are carried by rollers 56 and by rollers 57, and the rollers are mounted in frames each tiltable about an axis designated 58′, the tiltable movement being effected mechanically, and the rollers providing pressure upon the tire bands or other elements passing beneath the belts of individual units—light pressure by the belts drawing the tire units from members 50.

Figure 4:
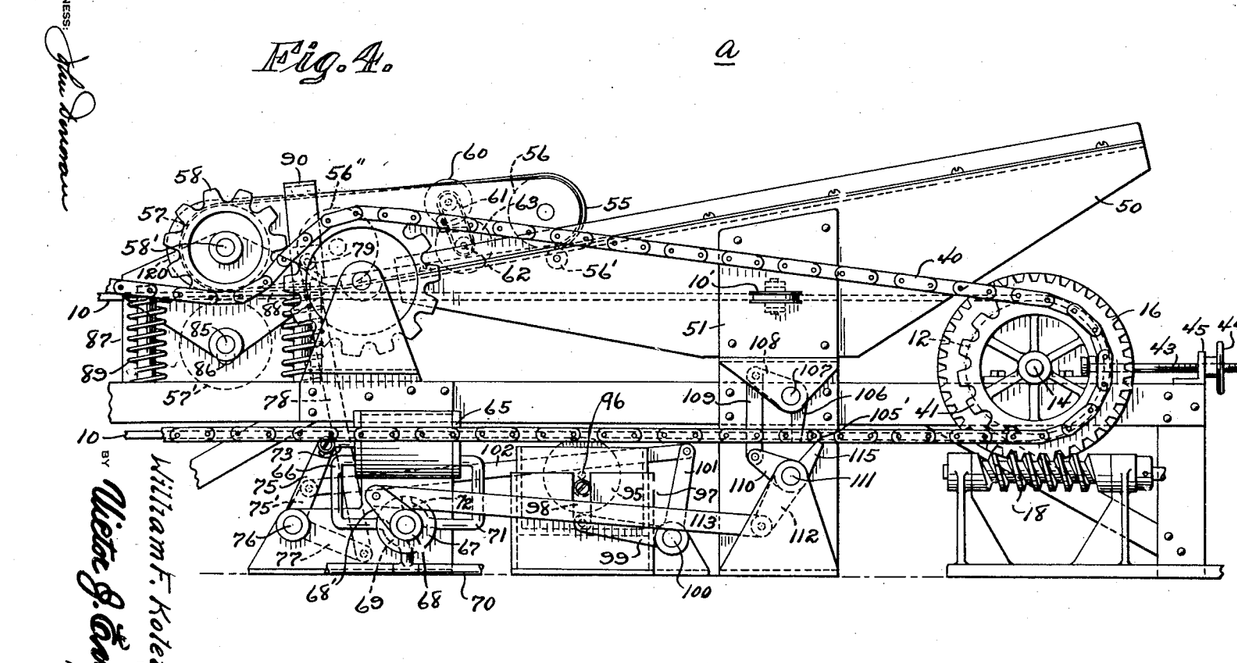
Figure 4 is a fragmentary view showing in elevation the right hand unit end of the machine appearing in Figures 1, 2 and 3, and regarded as unit "a".

Sprocket wheels 58 each bear on chain 40, as shown in Figure 4 and elsewhere, and a motor 60, is belted as shown at 61 to the axle element 62 of rotary cutter 63, by means of which the edges of the folded tire band are trimmed (before passing from member 50).

The tilting or swinging devices each protect the operator at that point, and when lifted the lower end portion prevents the built-up tire structure from passing this unit, or other similar unit of the device. Moreover, the operator is free after he places the tire unit on member 50 to give attention to the next unit, and releases pressure on member 21, the apparauts continuing to operate.

In order to effect the lifting movement of the frames in which the operative elements of the belts 50 are mounted, I provide air controlled means including, in connection with each unit, a cylinder such as 65 having an inlet pipe 66 connected therewith, this element 66 being in communication with casing 67 of rotary valve 68 by means of which air is admitted thru air port 69 from a pipe 70 thru which air is supplied. The exhaust from cylinder 65 is thru pipe 71, and thru valve 68 adapted to be placed in communication with exhaust port 72.

A piston rod 73 controlled by piston 74, has connection with crank arm 75, movable with shaft 76, and another crank arm 77 simultaneously movable imparts movement to upwardly extending bar 78, by means of which the frames mounting the belts 55 and the associated elements are controlled, the connection at 79 between bar 78 and the mounting means of the belts 55 and associated elements producing the result desired.

In Figure 4 showing section $a$, roller 56 cooperates with roller 56′ in the inclined element of table 50 of that section, and roller 57 is immediately above roller 57′, the latter being beneath conveyor 10 and having its shaft 85 in slots 86 in vertical stationary brackets 87.

Figure 11:
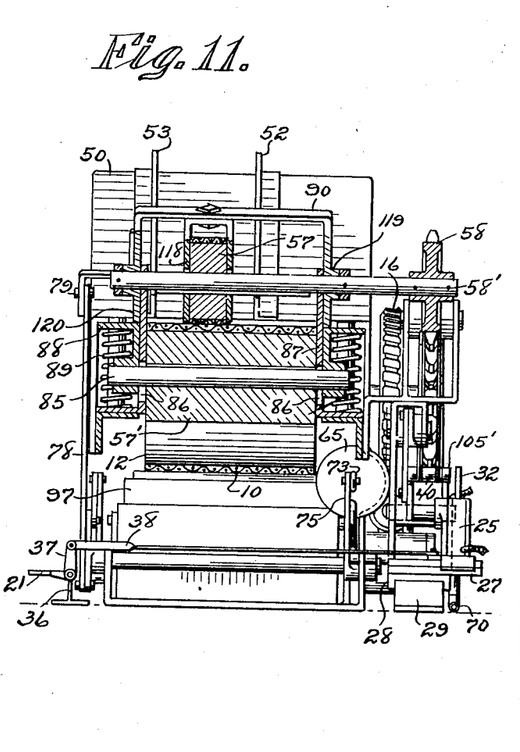
Figure 11 is a vertical transverse section, on line 11—11 of Figure 6.

Each bracket 88 of Fig. 11 receives shaft 85 and has an upper lateral flange against which springs 89 impart upward thrust, holding the rollers 57′ in contact with conveyor 10.

A U-shaped frame 90 has extensions which swing about the axis defined by shaft 58′ of roller 57, and this frame 90 is connected with the main frame of each tire band applying device, mounting a belt or belts of suitable number, such as belt 55, this arrangement providing for upward inclination with reference to table 50 while the operator is placing the tire element or tire band in position.

In section $a$ the position would be directly on the table 50, and in subsequent steps of the process of assembly, in connection with the remaining sections of the apparatus, tire elements are of course applied one above the other.

Liquid adhesive material is applied to the conveyor by apparatus wherein a roller 95 or spaced rollers or disks are adjustable on shaft 96 in container 97 receiving the adhesive material,—upward movement of the container for bringing the liquid into contact with the rotary elements being effected by links 98 connected with arm or arms 99 rocked by shaft 100. This shaft receives positive movement thru arm 101, rod 102 and arm 75 on shaft 76 before referred to as moving with piston rod 73 of the air operated device including cylinder 65 of Figure 4.

Figure 12A:
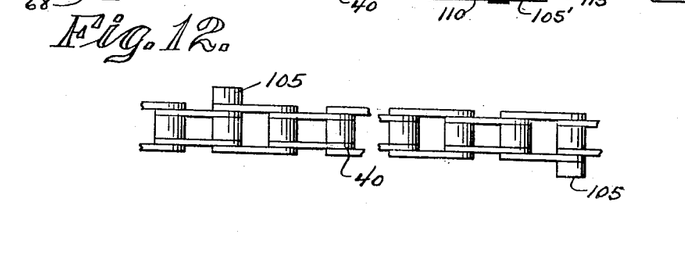
Figure 12 is a detail in top plan showing a portion of the chain, with engaging devices on opposite sides thereof, and adapted to control the trips mentioned below.

Chain 40 carries inner lugs 105 and outer lugs 105' as will be observed from Figure 12, and in Figure 4 lug 105 engages arm 106 movable about axis 107 and rocks arms 108 operating link 109 and arm 110 movable about axis 111. Arm 112, angularly movable about the same axis, is pivoted to bar 113 and rocks arm 68' controlling valve 68 for the air cylinder 65, by means of which the tire element applying device including belt or belts 55 is swung about a horizontal axis, as before indicated.

The other lug 105' on the chain 40 engages trip 115 and produces reverse movement of valves 68 for air cylinder 65.

Figure 7A:
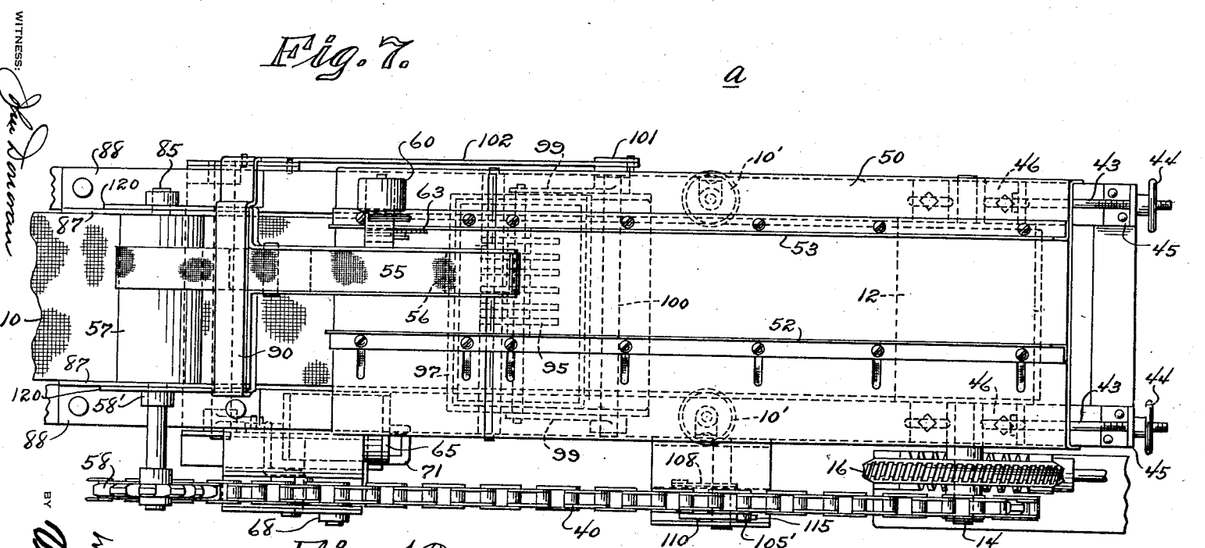
Figure 7 is a plan view, chiefly of unit "a", a portion of the structure described below being in dotted lines.
Figure 8:
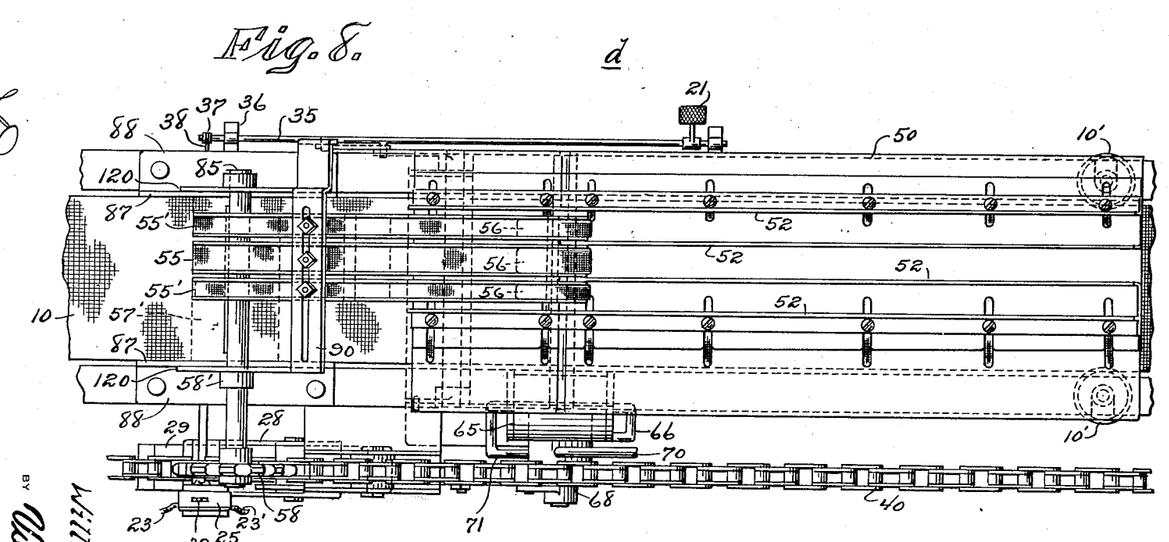
Figure 8 is a plan view of one unit, such as unit "d".
Figure 10:
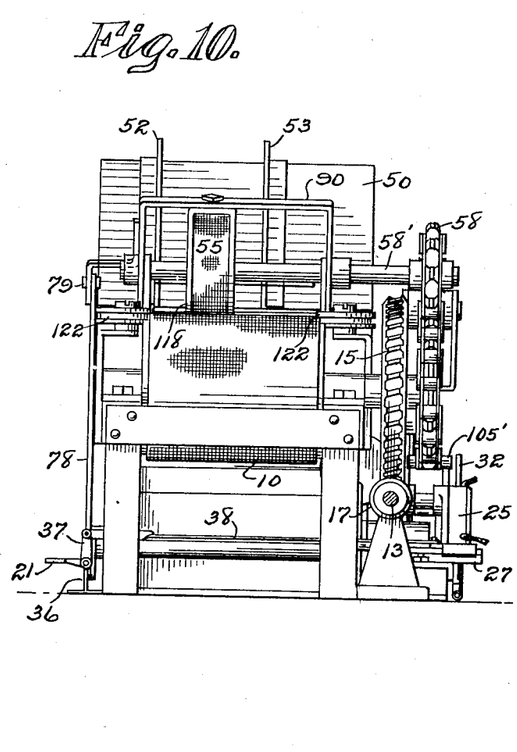
Figure 10 is a view showing one of the units in end elevation, and showing in section and elevation a portion of the worm drive.

In connection with the details of construction, it will be observed that in Figures 7 etc. conveyor belt 10 is guided by flanged wheels 10' mounted on vertical axes, and in Figures 10 and 11 belt 50 of the applying device there shown passes over a roller 57 loose on shaft 58', the roller being within frame 118 depending from swinging frame 90 having bearings 119 thru which the shaft of driving sprocket wheel 58 of unit e passes.

The heel portions 120 of the swinging frame bear on the upper flanges 88 of brackets 87. Figure 10 shows belt guiding means 122 serving an obvious purpose. Various well known mechanical adjustments may be provided where desired, as for instance in bar 113 of the controlling means for the air valve 68, this bar being shown in Figure 5 as slotted and formed in two sections connected by bolts 113'.

Unit a rolling the first folded tire band includes one belt 55 which is brought into contact with the tire band automatically by the closing of this applying device when one of the trips 105 on chain 40 comes into position for operating the air controlled means of the first unit designated a. Rotary cutting means 63 trim the edge, producing separate first and second plies.

Unit b for applying the beads to the first folded tire band includes two belts 55, and the mounting means of one of these belts is adjustable at 120 longitudinally of the mounting rollers 57 for these belts, so that provision is made for different widths of tire bands. One of the guides of this unit is adjustable for widths, as before indicated.

Unit c rolls the second folded tire band when placed above the beads by the operator, and includes one belt such as 55. The applying device of this unit c carries a rotary cutter 63 for trimming the edges of the folded band which provides the third and fourth plies of the tire. Slotted mounting means provide for adjustment according to widths. (See the mounting of the belt carrying means in Figure 9.)

Figure 9:
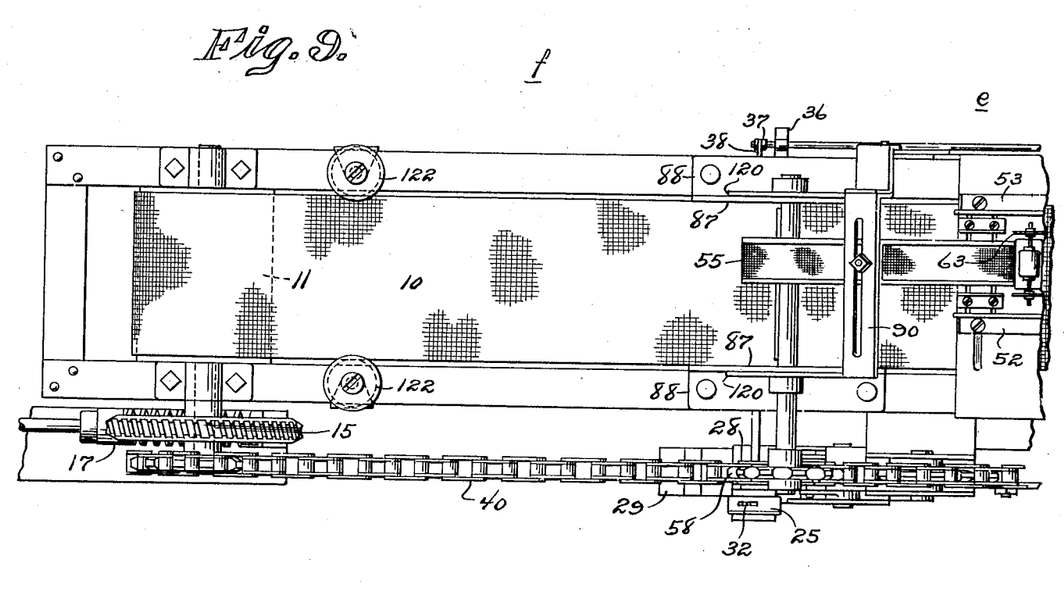
Figure 9 is a plan view of unit "f".

Unit d applying the breaker strip in the central and the chafing strips on the side, has a central applying belt such as 55, and the mounting means of the belt are to be adjustable for widths as in Figure 9, and of the two chafing strip applying belts 55', one will be similarly adjustable for widths.

Unit e will apply the tread and will carry two rotary cutting devices such as 63 for trimming both edges of the tread structure carried along by the conveyor at this stage of the operation. Adjustment of the cutters laterally of the conveyor will be provided as before.

Section f presents the flat tire structure in completed condition with the ends of the plies in staggered relation for producing a splice with the abutting ends of the elements out of alignment transversely, thus forming an effective broken joint or splice.

Having described the invention, what is claimed is:—

1. In a tire building apparatus, a conveyor, a plurality of units with reference to which the conveyor moves the elements of a tire being assembled in flat form, each of said units including swinging tire-element applying-means, and pressure operated means for intermittently moving the applying means with reference to the conveyor.

2. In a tire building apparatus, a conveyor, a plurality of units with reference to which the conveyor moves the elements of a tire being assembled in flat form, each of said units including swinging tire-element applying-means, pressure operated means for intermittently moving the applying means with reference to the conveyor, and means automatically controlling the pressure operated means.

3. In a tire building apparatus, a conveyor, a plurality of units with reference to which the conveyor moves the elements of a tire being assembled in flat form, each of said units including swinging tire-element applying-means, pressure operated means for intermittently moving the applying means with reference to the conveyor, means automatically controlling the pressure operated means, and manual means for temporarily throwing out the automatic means.

4. In a tire building apparatus, a conveyor, a plurality of units with reference to which the conveyor moves the elements of a tire being assembled in flat form, each of said units including swinging tire-element applying-means, pressure operated means for intermittently moving the applying means with reference to the conveyor, and a travelling element imparting motion to the applying means and timing the movement thereof.

5. In a tire building apparatus, a conveyor, a plurality of units with reference to which the conveyor moves the elements of a tire being assembled in flat form, each of said units including swinging tire-element apply-ing-means, pressure operated means for intermittently moving the applying means with reference to the conveyor, and a power driven travelling element imparting motion to the applying means and timing operation thereof.

6. In a tire building apparatus, a conveyor, a plurality of units with reference to which the conveyor moves the elements of a tire being assembled in flat form, each of said units including swinging tire-element applying-means, pressure operated means for intermittently moving the applying means with reference to the conveyor, a travelling element imparting motion to the applying means and timing the movement thereof, the conveyor and travelling element being movable in parallel paths.

7. In a tire building apparatus, a conveyor, a plurality of units with reference to which the conveyor moves the elements of a tire being assembled in flat form, each of said units including swinging tire-element applying-means, pressure operated means for intermittently moving the applying means with reference to the conveyor, said swinging means including a belt movable longitudinally above the conveyor.

8. In a tire building apparatus, a conveyor, a plurality of units with reference to which the conveyor moves the elements of a tire being assembled in flat form, each of said units including swinging tire-element applying-means, pressure operated means for intermittently moving the applying means with reference to the conveyor, said swinging means including a belt movable longitudinally above the conveyor, and including edge trimming means for the bands of the tire.

9. In a tire building apparatus, a conveyor, a plurality of units with reference to which the conveyor moves the elements of a tire being assembled in flat form, each of said units including swinging tire-element applying-means, pressure operated means for intermittently moving the applying means with reference to the conveyor, said swinging means including a belt movable longitudinally above the conveyor, and transversely of the conveyor.

10. In a tire building apparatus, a conveyor, a plurality of units with reference to which the conveyor moves the elements of a tire being assembled in flat form, each of said units including swinging tire-element applying-means, pressure operated means for intermittently moving the applying means with reference to the conveyor, said swinging means including a belt movable longitudinally above the conveyor, and including edge trimming means for the bands of the tire, the belt and trimming means being adjustable transversely of the path of the conveyor.

11. In a tire building apparatus, a conveyor, means for applying adhesive material to the conveyor, a plurality of units with reference to which the conveyor moves the elements of a tire being assembled in flat form, each of said units including swinging tire-element applying-means, and pressure operated means for intermittently moving the applying means with reference to the conveyor.

12. In a tire building apparatus, a conveyor, a plurality of units with reference to which the conveyor moves the elements of a tire being assembled in flat form, each of said units including swinging tire-element applying-means, pressure operated means for intermittently moving the applying means with reference to the conveyor, means automatically controlling the pressure operated means, and means for applying adhesive material to the conveyor in timed relation to the operation of the pressure operated means.

13. In a tire building apparatus, a conveyor, a plurality of units with reference to which the conveyor moves the elements of a tire being assembled in flat form, each of said units including swinging tire-element applying-means, pressure operated means for intermittently moving the applying means with reference to the conveyor, means of the endless chain type and engaging devices thereon, for controlling the time of action of the pressure operated means, said endless chain imparting movement to the applying means and conveyor.

14. In a tire building apparatus, a conveyor, a plurality of units with reference to which the conveyor moves the elements of a tire being assembled in flat form, each of said units including swinging tire elements applying means, and pressure operated means for moving the applying means to operative position, said pressure operated means including devices having valves independently controlled from one source.

15. In a tire building apparatus, a conveyor, adjustable guiding means mounted adjacent thereto and adapted to position folded tire elements of different widths, adjustable travelling applying means mounted above the conveyor, edge trimming means adjustably mounted, means for applying beads to the tire element, means for applying a second tire element to that first named, above the beads, means for applying a breaker strip and chafing strips, and means for applying a tread, all of the elements applied being flat, and mechanism for timing and imparting power to all of the applying means.

In testimony whereof I affix my signature.

WILLIAM F. KOLETA.